US010611491B2

(12) United States Patent
Kono

(10) Patent No.: US 10,611,491 B2
(45) Date of Patent: Apr. 7, 2020

(54) TORQUE ESTIMATION APPARATUS FOR AIRCRAFT, AIRCRAFT, AND TORQUE ESTIMATION PROGRAM AND TORQUE ESTIMATION METHOD FOR AIRCRAFT

(71) Applicant: MITSUBISHI HEAVY INDUSTRIES, LTD., Tokyo (JP)

(72) Inventor: Naoki Kono, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 174 days.

(21) Appl. No.: 15/812,055

(22) Filed: Nov. 14, 2017

(65) Prior Publication Data

US 2018/0134409 A1 May 17, 2018

(30) Foreign Application Priority Data

Nov. 15, 2016 (JP) .................................. 2016-222347

(51) Int. Cl.
| B64D 45/00 | (2006.01) |
| B64D 43/00 | (2006.01) |
| B64C 27/12 | (2006.01) |
| B64C 27/06 | (2006.01) |

(52) U.S. Cl.
CPC .............. *B64D 45/00* (2013.01); *B64C 27/12* (2013.01); *B64D 43/00* (2013.01); *B64C 27/06* (2013.01)

(58) Field of Classification Search
None
See application file for complete search history.

(56) References Cited

U.S. PATENT DOCUMENTS

| 7,032,812 B2 * | 4/2006 | Ostini .................... B21D 28/12 234/43 |
| 2013/0184959 A1 * | 7/2013 | Wendelsdorf .......... B64C 27/04 701/99 |
| 2014/0379177 A1 * | 12/2014 | Takasaki ................ B64D 45/00 701/14 |
| 2016/0032829 A1 * | 2/2016 | Dyrla ...................... F01D 21/14 416/1 |
| 2016/0273379 A1 * | 9/2016 | Soares, Jr. ......... G05B 23/0254 |
| 2017/0328282 A1 * | 11/2017 | Jensen .................... F02C 7/277 |

FOREIGN PATENT DOCUMENTS

JP 2013-203334 10/2013

* cited by examiner

*Primary Examiner* — Thomas G Black
*Assistant Examiner* — Demetra R Smith-Stewart
(74) *Attorney, Agent, or Firm* — Wenderoth, Lind & Ponack, L.L.P.

(57) ABSTRACT

A torque estimation apparatus that estimates an available torque of an engine of a helicopter includes: a storage device that stores therein first engine torque data before degradation of engine performance and second engine torque data after the degradation of the engine performance; and a control device that estimates, based on the first and second engine torque data, an available torque, and the control device executes: standardization processing of obtaining and standardizing present engine performance parameter and engine torque; engine performance factor calculation processing of calculating, based on the first and second engine torque data, an engine performance factor from the standardized engine performance parameter and engine torque; and available torque calculation processing of calculating, based on the engine performance factor, an available torque corresponding to present performance of the engine.

10 Claims, 4 Drawing Sheets

TORQUE ESTIMATION APPARATUS FOR AIRCRAFT, AIRCRAFT, AND TORQUE ESTIMATION PROGRAM AND TORQUE ESTIMATION METHOD FOR AIRCRAFT

CROSS-REFERENCE TO RELATED APPLICATIONS

The present application claims priority to and incorporates by reference the entire contents of Japanese Patent Application No. 2016-222347 filed in Japan on Nov. 15, 2016.

FIELD

The present disclosure relates to a torque estimation apparatus for an aircraft, the aircraft, and a torque estimation program and a torque estimation method for the aircraft, estimating engine torque of an engine provided in the aircraft.

BACKGROUND

Conventionally, a torque estimation apparatus that estimates magnitude of available torque that is usable in an engine of an aircraft has been known (for example, see Patent Literature 1). The torque estimation apparatus stores therein measurement points having measured values of a parameter related to performance of the engine in association with measured values of engine torque for those measured values, together with times of the measurement. The torque estimation apparatus generates, based on the stored plural measurement points, an approximate equation for a performance curve, and estimates an available torque from a performance curve of the generated approximate equation. If more than one measurement point is unable to be obtained, the approximate equation is unable to be generated, and thus a performance curve of an approximate equation that has been obtained beforehand is parallelly translated to a measurement point, and an available torque is estimated from the parallelly translated performance curve.

CITATION LIST

Patent Literature

Patent Literature 1: Japanese Unexamined Patent Application Publication No. 2013-203334 A

SUMMARY

Technical Problem

However, in this torque estimation of Patent Literature 1, since a performance curve of an approximate equation that has been obtained in advanced is parallelly translated to a measurement point when more than one measurement point is unable to be obtained, there may be a deviation from the actual performance of the engine, and it may be difficult for the available torque to be estimated accurately. Further, since the approximate equation is generated after plural measurement points are obtained, it takes time for the available torque to be accurately estimated.

Thus, an object of the present invention is to provide a torque estimation apparatus for an aircraft, the aircraft, a torque estimation program for the aircraft, and a torque estimation method for the aircraft, enabling an available torque to be accurately and quickly estimated.

Solution to Problem

A torque estimation apparatus for an aircraft according to the present disclosure estimates an available torque that is an engine torque usable in an engine, the engine rotating a rotor that is provided in the aircraft. The torque estimation apparatus includes a storage unit that stores therein engine torque data having a parameter related to engine performance of the engine and the engine torque in association with each other, the engine torque data including first engine torque data that are the engine torque data before degradation of the engine performance, and second engine torque data that are the engine torque data after the degradation of the engine performance, and an arithmetic unit that estimates, based on the first engine torque data and the second engine torque data, the available torque. The arithmetic unit executes information obtainment processing of obtaining the present parameter obtained from the engine, and the engine torque corresponding to the parameter, standardization processing of executing standardization by removing a factor unnecessary for estimation of the available torque, from the obtained parameter and engine torque, engine performance factor calculation processing of calculating, based on the first engine torque data and the second engine torque data, an engine performance factor that is a degree of performance degradation of the engine, from the parameter and engine torque that have been standardized, and available torque calculation processing of calculating, based on the calculated engine performance factor, the available torque corresponding to present performance of the engine.

A non-transitory computer readable recording medium storing thereon a torque estimation program according to the present disclosure is executed in a torque estimation apparatus that is hardware provided in an aircraft. The torque estimation apparatus includes a storage unit that stores therein engine torque data having a parameter related to engine performance of an engine that rotates a rotor provided in the aircraft and the engine torque in association with each other, the engine torque data including first engine torque data that are the engine torque data before degradation of the engine performance, and second engine torque data that are the engine torque data after the degradation of the engine performance, and an arithmetic unit that estimates, based on the first engine torque data and the second engine torque data, an available torque that is an engine torque usable in the engine, and the torque estimation program causes the arithmetic unit to execute information obtainment processing of obtaining the present parameter obtained from the engine, and the engine torque corresponding to the parameter, standardization processing of executing standardization by removing a factor unnecessary for estimation of the available torque, from the obtained parameter and engine torque, engine performance factor calculation processing of calculating, based on the first engine torque data and the second engine torque data, an engine performance factor that is a degree of performance degradation of the engine, from the parameter and the engine torque that have been standardized, and available torque calculation processing of calculating, based on the calculated engine performance factor, the available torque corresponding to present performance of the engine.

A torque estimation method for an aircraft according to the present disclosure estimates an available torque that is an engine torque usable in an engine, the engine rotating a rotor provided in the aircraft. Engine torque data having a parameter related to engine performance of the engine and the engine torque in association with each other are prepared beforehand, the engine torque data including first engine torque data that are the engine torque data before degradation of the engine performance, and second engine torque data that are the engine torque data after the degradation of the engine performance. The torque estimation method includes an information obtainment process of obtaining the present parameter obtained from the engine, and the engine torque corresponding to the parameter, a standardization process of executing standardization by removing a factor unnecessary for estimation of the available torque, from the obtained parameter and engine torque, an engine performance factor calculation process of calculating, based on the first engine torque data and the second engine torque data, an engine performance factor that is a degree of performance degradation of the engine, from the parameter and the engine torque that have been standardized, and an available torque calculation process of calculating, based on the calculated engine performance factor, the available torque corresponding to present performance of the engine.

According to these configurations, based on the first engine torque data and the second engine torque data, the engine performance factor is calculated from the present parameter and engine torque obtained from the engine, and based on the engine performance factor, the available torque corresponding to the present performance of the engine is able to be calculated. Therefore, since obtaining more than one measurement point as done conventionally is not necessary, even if more than one measurement point is unable to be obtained, based on the engine performance factor, the available torque is able to be estimated accurately and quickly. The first engine torque data are, for example, data obtained from a brand new engine, and the second engine torque data are, for example, data obtained from an engine to be discarded. Further, the first engine torque data and the second engine torque data are arbitrarily settable.

Further, where the parameter and the engine torque, which have been standardized in the standardization processing, are a standardized parameter and a standardized torque, in the engine performance factor calculation processing, preferably: the parameter of the first engine torque data corresponding to the standardized torque is obtained as a first parameter; the parameter of the second engine torque data corresponding to the standardized torque is obtained as a second parameter; and a ratio of a difference between the first parameter and the standardized parameter with respect to a difference between the obtained first parameter and second parameter is calculated as the engine performance factor.

According to this configuration, by use of the first parameter, the second parameter, and the standardized parameter, the engine performance factor is able to be calculated easily.

Further, in the available torque calculation processing, preferably: the engine torque of the first engine torque data corresponding to a preset limit value for the parameter is obtained as a first engine torque; the engine torque of the second engine torque data corresponding to the preset limit value is obtained as a second engine torque; and the engine torque corresponding to the difference between the first parameter and the standardized parameter when the difference between the first parameter and the second parameter for the engine performance factor is made to correspond to a difference between the obtained first engine torque and second engine torque is calculated as the available torque.

According to this configuration, each of the differences for the engine performance factor is made to correspond to the engine torque, and thereby the available torque is able to be calculated easily.

Further, in the information obtainment processing, the parameter and the engine torque are preferably obtained in a torque region that is equal to or greater than 20% of a rated torque, the rated torque being the engine torque that has been rated.

According to this configuration, since, in calculation of the available torque, the parameter and the engine torque are able to be obtained in an appropriate torque region, an accurate available torque is able to be calculated. The rated torque is the maximum torque that is able to be used continuously by the aircraft with respect to the engine and the transmission as a whole, and is normally a value lower than the available torque of the engine. By the torque region being equal to or greater than 30%, the available torque that is more accurate is able to be calculated.

Further, in the standardization processing, standardization is preferably executed by correction of the parameter and the engine torque such that the unnecessary factor, which is load applied to the parameter and the engine torque due to use of the loading device provided in the aircraft, is removed.

According to this configuration, since appropriate parameter and engine torque that have been standardized are able to be obtained, the available torque is able to be calculated accurately. The loading device is, for example, an air conditioning device, an anti-icing device, and the like.

Further, preferably, plural types of engine output ratings are set for the engine, and the available torque is estimated according to each of the types of engine output ratings.

According to this configuration, the available torques for the plural types of engine output ratings are able to be calculated. The plural types of engine output ratings include, for example, a normal output rating of the engine at the normal time of the aircraft, and an emergency output rating of the engine at the time of emergency of the aircraft, and available torques corresponding to these engine output ratings are able to be calculated.

Further, preferably, the display unit is further included, and the arithmetic unit accumulates the engine performance factors calculated in the engine performance factor calculation processing, in association with the times of calculation thereof, into the storage unit, and causes the display unit to display thereon the engine performance factors that have been stored in the storage unit, as a history of the engine performance factors arranged in chronological order.

According to this configuration, since the history of the engine performance factors is able to be displayed on the display unit, the change in engine performance factor over time is able to be grasped.

The aircraft of the present invention is characterized in that the aircraft includes the aircraft body, the rotor provided in the aircraft body, the engine that is provided in the aircraft body and rotates the rotor, and the above stated torque estimation apparatus.

According to this configuration, based on an available torque estimated accurately and quickly, a pilot is able to manipulate an aircraft, and thus contribution to improvement of safety upon flight of the aircraft is able to be made.

DESCRIPTION OF EMBODIMENTS

Hereinafter, embodiments according to the present invention will be described in detail, based on the drawings. The present invention is not limited by these embodiments. Further, components in the following embodiments include any component that is easily substitutable by those skilled in the art or any component that is substantially the same. Furthermore, the components described below may be combined with one another, as appropriate, and when there are plural embodiments, any of the embodiments may be combined with one another.

Embodiments

Figure 1:
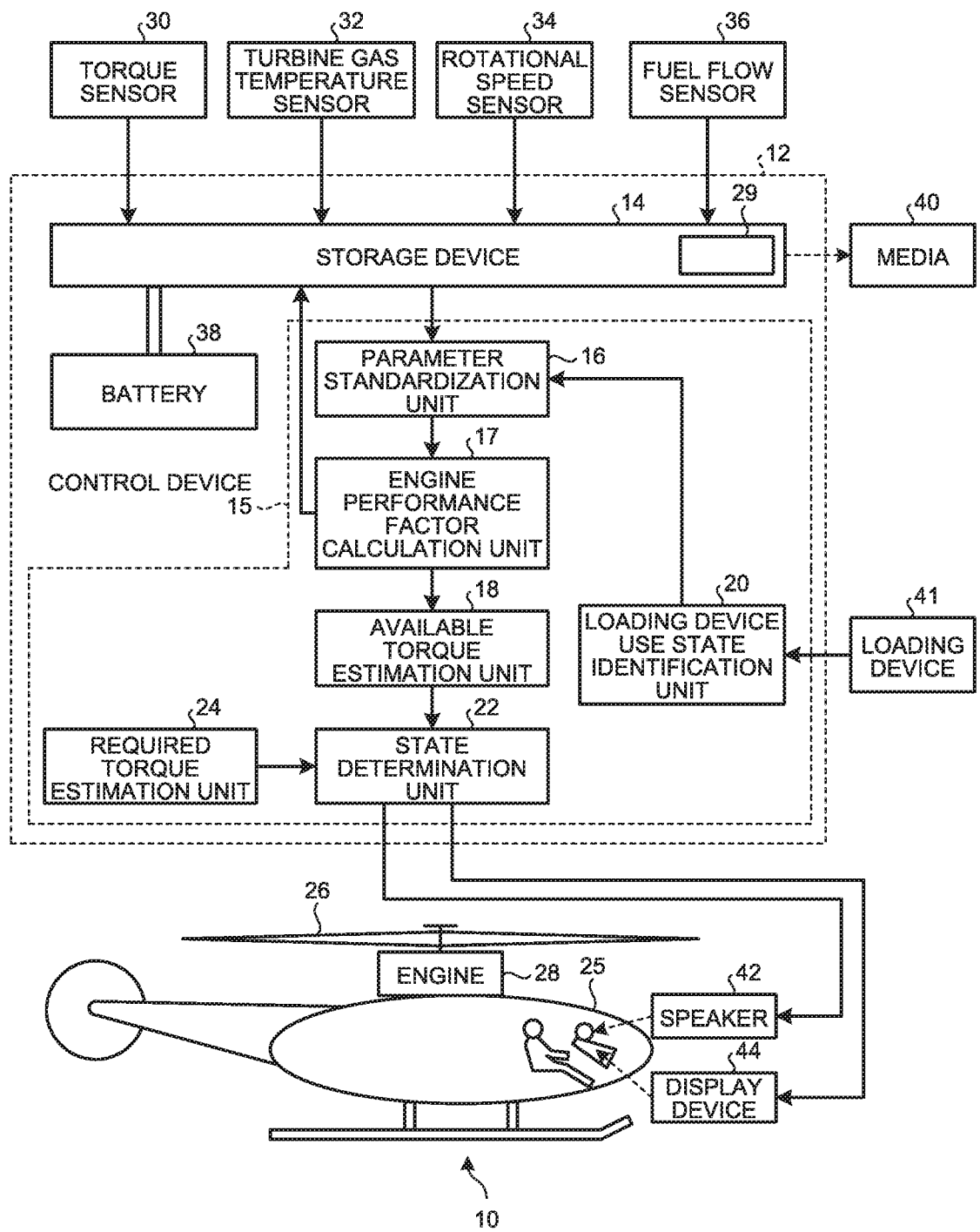
FIG. 1 is an explanatory diagram related to a torque estimation apparatus for a helicopter, according to an embodiment.
Figure 2:
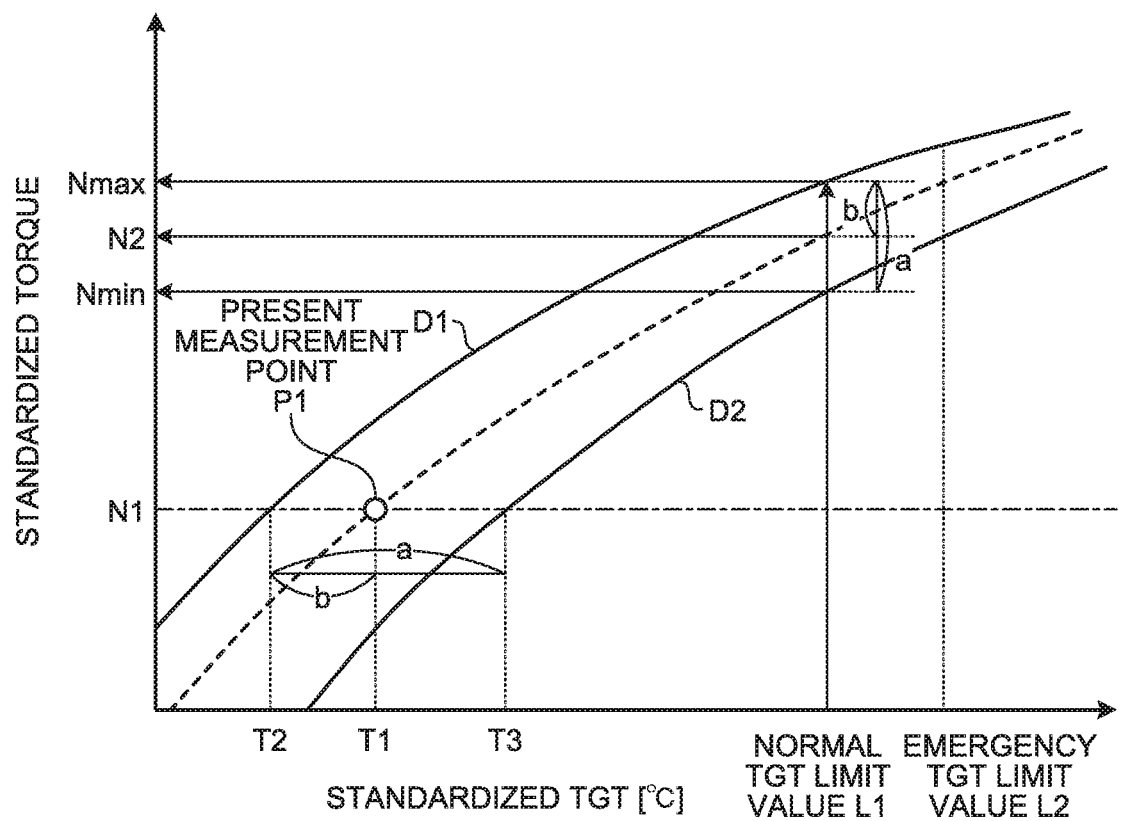
FIG. 2 is an explanatory diagram related to engine torque data according to the embodiment.
Figure 3:
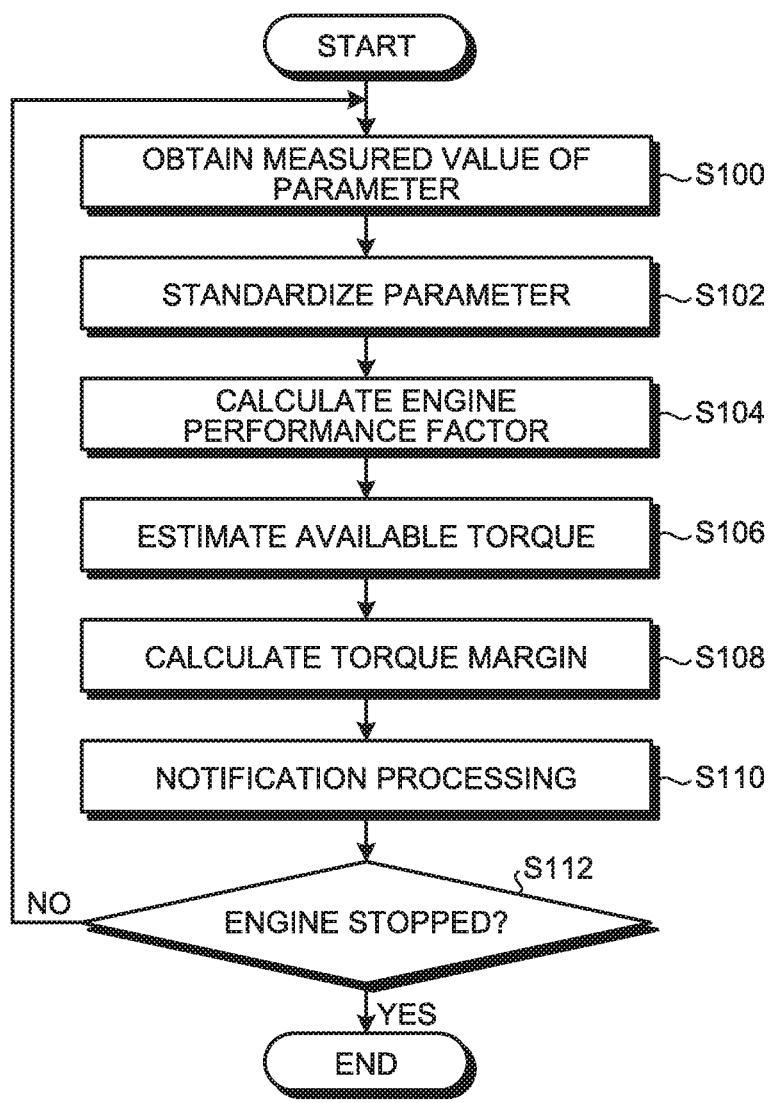
FIG. 3 is a flow chart illustrating a flow of processing of a torque estimation program according to the embodiment.
Figure 4:
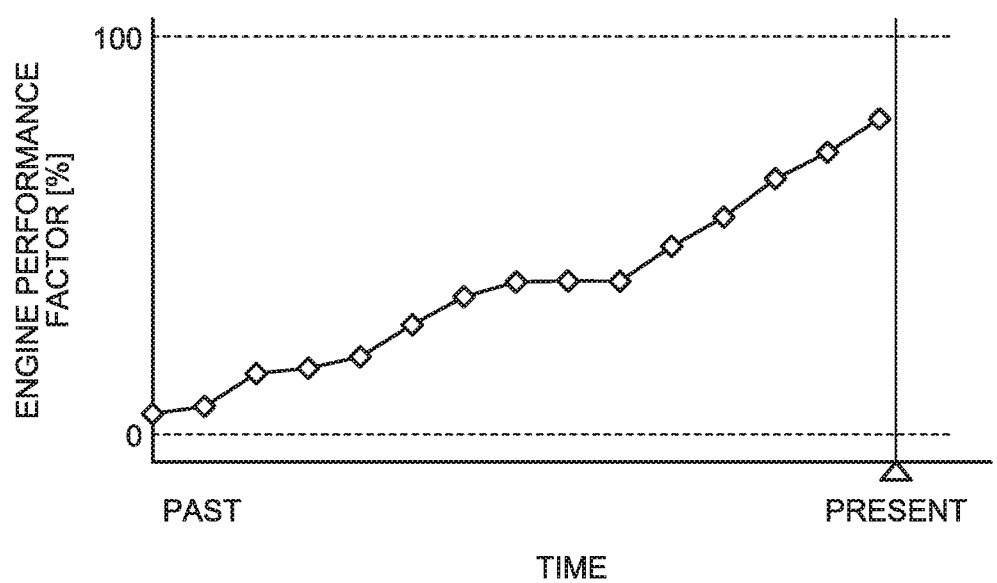
FIG. 4 is a graph illustrating a history of engine performance factor according to the embodiment.

FIG. 1 is an explanatory diagram related to a torque estimation apparatus for a helicopter, according to an embodiment. FIG. 2 is an explanatory diagram related to engine torque data according to the embodiment. FIG. 3 is a flow chart illustrating a flow of processing of a torque estimation program according to the embodiment. FIG. 4 is a graph illustrating a history of engine performance factor according to the embodiment.

A torque estimation apparatus 12 of this embodiment is provided in an aircraft having a rotor 26, and is applied to, for example, a helicopter 10. The torque estimation apparatus 12 estimates an available torque, which is an engine torque usable in an engine 28 that rotates the rotor 26. Firstly, before description of the torque estimation apparatus 12, the helicopter 10 will be described.

The helicopter 10 is a vertical takeoff and landing aircraft that is able to take off and land in a vertical direction, and includes: an airframe (aircraft body) 25; the rotor 26 provided in the airframe 25; and the engine 28 that rotates the rotor 26. A speaker 42 and a display device (display unit) 44 for various indications to a pilot who manipulates the helicopter 10 are provided in the airframe 25. A gas turbine engine, for example, is applied to the engine 28, and the gas turbine engine has a compressor, a combustor, and a turbine. The compressor compresses air taken in, the combustor generates combustion gas by causing the compressed air and fuel to be mixed together and to undergo combustion, and the turbine rotates the rotor 26 by rotating due to the generated combustion gas. In the helicopter 10, the engine 28 provided in the airframe 25 exerts engine torque necessary for the rotor 26 to be rotated (required torque) on the rotor 26, and thus the airframe 25 undergoes predetermined flying motion.

Further, the helicopter 10 includes: various sensors, which are for measurement of parameters related to performance of the engine 28 (hereinafter, referred to as "engine performance parameters") and will be described later; and an onboard computer that controls the helicopter 10. The engine performance parameters according to this embodiment are turbine gas temperature (TGT), engine rotational speed, fuel flow, and the like. The turbine gas temperature (TGT) is temperature of combustion gas that is blown to the turbine provided in the gas turbine engine, for the turbine to be rotated. Furthermore, there are two types of engine rotational speed, which are rotational speed of the compressor of the gas turbine engine, and rotational speed of the turbine connected to the rotor 26, and as an engine performance parameter, the rotational speed of the compressor is adopted. The onboard computer is connected to the various sensors, and functions as the torque estimation apparatus 12 by executing a torque estimation program 29, which is a program for estimation of available torque.

Provided as the various sensors are: a torque sensor 30 that measures magnitude of torque of the engine 28; a turbine gas temperature sensor 32 that measures the turbine gas temperature (TGT) of the engine 28; a rotational speed sensor 34 that measures the engine rotational speed; a fuel flow sensor 36 that measures the fuel flow; and the like. The various sensors 30, 32, 34, and 36 are connected to the torque estimation apparatus 12, and measured values of the engine performance parameters measured by the various sensors 30, 32, 34, and 36 are stored in a storage device 14 provided in the torque estimation apparatus 12.

Next, the torque estimation apparatus 12 will be described. The torque estimation apparatus 12 has the storage device (storage unit) 14 and the control device (arithmetic unit) 15.

The storage device 14 is formed of a storage device having non-volatility, such as a magnetic storage device or a semiconductor storage device, and stores therein various programs and data. The programs stored in the storage device 14 include the above mentioned torque estimation program 29 for estimation of the available torque. Further, the data stored in the storage device 14 include: the measured values of the engine performance parameters measured by the various sensors 30, 32, 34, and 36; first engine torque data D1 and second engine torque data D2 that are used in estimation of an available torque; and data related to an engine performance factor calculated for the estimation of the available torque.

Further, a battery 38 that supplies electric power to the storage device 14 is connected to the storage device 14. Thereby, even if power of the airframe 25 is turned OFF, data are able to be read out from the storage device 14 into media 40 that are outside thereof. Therefore, a maintenance person is able to use the data upon maintenance or the like of the helicopter 10.

The control device 15 includes an integrated circuit, such as a central processing unit (CPU), and a memory that serves as a work area, and executes various types of processing by executing the various programs through use of these hardware resources. Specifically, the control device 15 executes the various types of processing by reading out and expanding the programs stored in the storage device 14 into the memory, and causing the CPU to execute instructions included in the programs expanded in the memory.

By executing the torque estimation program 29, the control device 15 functions as a parameter standardization unit 16, an engine performance factor calculation unit 17, an available torque estimation unit 18, a loading device use state identification unit 20, a state determination unit 22, and a required torque estimation unit 24.

The parameter standardization unit 16 obtains a present engine performance parameter from the various sensors via the storage device 14, and an engine torque corresponding to the engine performance parameter, and executes standardization processing of standardizing the obtained engine performance parameter and engine torque. The parameter standardization unit 16 obtains the engine performance parameter and the engine torque in a torque region where the engine torque of the engine 28 is equal to or larger than 30% of a rated torque. The rated torque is the maximum torque that the helicopter 10 is able to use continuously with respect to the engine 28 and a transmission that is provided in a power transmission route between the engine 28 and the rotor 26 as a whole. This rated torque is normally a value lower than the available torque of the engine 28. Thereby, the parameter standardization unit 16 obtains the engine performance parameter and the engine torque in a torque region suitable for estimation of the available torque. In this embodiment, the engine performance parameter and the engine torque are obtained in the torque region where 30% or more of the rated torque is reached, but not being particularly limited to this range, the engine performance parameter and the engine torque may be obtained at least in a torque region where 20% or more of the rated torque is reached.

In the standardization processing, standardization is executed by removal of any factors that are unnecessary for the estimation of the available torque. The unnecessary factors include load applied to the engine performance parameter and the engine torque due to use of a loading device 41. Further, the unnecessary factors include, for example, outside air temperature outside the helicopter 10, altitude where the helicopter 10 is flying, and velocity of the helicopter 10. Thus, the parameter standardization unit 16 standardizes the obtained engine performance parameter and engine torque to generate a standardized parameter and a standardized torque that have been standardized, by correction for removal of influence on the present engine performance parameter and engine torque, based on the unnecessary factors including a use state of the loading device 41 identified by the loading device use state identification unit 20 described later.

The engine performance factor calculation unit 17 executes engine performance factor calculation processing of calculating, based on the first engine torque data D1 and second engine torque data D2 stored in the storage device 14, an engine performance factor, which is a degree of performance degradation of the engine 28, from the standardized parameter and standardized torque that have been standardized.

By reference to FIG. 2, the first engine torque data D1 and the second engine torque data D2 will be described. In FIG. 2, the vertical axis corresponds to standardized torque, and the horizontal axis corresponds to standardized TGT (standardized turbine gas temperature) that is a standardized parameter. Engine torque data are data having an engine performance parameter of the engine 28 and engine torque that have been associated with each other. The first engine torque data D1 are engine torque data before degradation of the engine performance, and are, for example, engine torque data obtained from the engine 28 that is brand new. In contrast, the second engine torque data D2 are engine torque data after the degradation of the engine performance, and are, for example, engine torque data obtained from the engine 28 that is to be discarded.

In the engine torque data, when the standardized TGT is constant, as the engine performance is degraded, the standardized torque is reduced. In other words, in the engine torque data, when the standardized torque is constant, as the engine performance is degraded, the standardized TGT is increased. Therefore, in the graph illustrated in FIG. 2, the first engine torque data D1 are positioned at an upper left side thereof, and the second engine torque data D2 are positioned at a lower right side thereof.

In the engine performance factor calculation processing, where a measurement point of a present standardized parameter T1 and a present standardized torque N1 is P1, a standardized parameter of the first engine torque data D1 corresponding to the present standardized torque N1 is obtained as a first parameter T2, and a standardized parameter of the second engine torque data D2 corresponding to the present standardized torque N1 is obtained as a second parameter T3. Thereafter, in the engine performance factor calculation processing, a difference, "a", between the obtained first parameter T2 and second parameter T3 is calculated, and a difference, "b", between the obtained first parameter T2 and standardized parameter T1 is calculated. Subsequently, in the engine performance factor calculation processing, a result obtained as a ratio of the calculated difference, "b", with respect to the calculated difference, "a", in percent is calculated as an engine performance factor. Therefore, the engine performance factor is calculated by a calculating formula, "b/a×100".

The available torque estimation unit 18 executes available torque calculation processing of calculating, based on the calculated engine performance factor, an available torque corresponding to the present performance of the engine 28. Plural types of engine output ratings are set for the engine 28, and in the available torque calculation processing, according to the types of engine output ratings, the available torques are respectively estimated. The types of engine output ratings include, for example, a normal output rating of the engine 28 at the normal time of the helicopter 10, and an emergency output rating of the engine 28 at the time of emergency of the helicopter 10. The available torque is restricted by the engine performance parameters (the turbine gas temperature (TGT), engine rotational speed, fuel flow, and the like) of the engine 28. That is, the available torque is, in other words, the maximum value of torque that the engine 28 is able to generate.

As illustrated in FIG. 2, a limit value of the standardized TGT at the normal output rating of the engine 28 is set beforehand as a normal TGT limit value L1, and a limit value of the standardized TGT at the emergency output rating of the engine 28 is set beforehand as an emergency TGT limit value L2.

In the available torque calculation processing, available torques corresponding to the preset normal TGT limit value L1 and emergency TGT limit value L2 are calculated. In the following description, a case where the available torque corresponding to the normal TGT limit value L1 is calculated will be explained, but calculation of the available torque corresponding to the emergency TGT limit value L2 is similar to that for the normal TGT limit value L1, and thus description thereof will be omitted.

In the available torque calculation processing, a standardized torque of the first engine torque data D1 corresponding to the normal TGT limit value L1 is obtained as a first engine torque Nmax, and a standardized torque of the second engine torque data D2 corresponding to the normal TGT limit value L1 is obtained as a second engine torque Nmin. Thereafter, in the available torque calculation processing, a standardized torque corresponding to the difference, "b", when the difference, "a", in the engine performance factor is made to correspond to a difference between the obtained first engine torque Nmax and second engine torque Nmin is calculated as a present available torque N2. That is, in the available torque calculation processing, by application of each of the differences, "a" and "b", in the standardized TGT for the engine performance factor to the standardized torque, the available torque N2 is calculated. In other words, in the available torque calculation processing, by application of the horizontal axis fraction in the engine performance factor to the vertical axis fraction, the available torque N2 is calculated.

The loading device use state identification unit 20 identifies a use state of the loading device 41 (for example, an air conditioning device, an anti-icing device, and the like) of the engine 28, the loading device 41 being different from the rotor 26. The loading device use state identification unit 20 then outputs information related to load applied to the engine 28 by the loading device 41, to the parameter standardization unit 16.

The state determination unit 22 determines whether or not the calculated available torque N2 is in a state of sufficiently fulfilling an engine torque (hereinafter referred to as "required torque") necessary for the rotor 26 to be rotated at the time of predetermined flying motion of the helicopter 10. Specifically, the state determination unit 22 calculates a torque margin resulting from subtraction of the required torque estimated by the required torque estimation unit 24 described later from the calculated available torque N2. If the torque margin is equal to or larger than a predetermined threshold, the state determination unit 22 determines that the available torque N2 is sufficient, while if the torque margin is less than the predetermined threshold, the state determination unit 22 determines that the available torque N2 is insufficient. Further, the state determination unit 22 notifies the pilot of a result of the determination through various indication devices, such as the speaker 42 and the display device 44, which are provided in the airframe 25. The state determination unit 22 just needs to notify the pilot of the available torque and the torque margin, and may be configured without the determination based on the torque margin.

The required torque estimation unit 24 estimates, based on outside air temperature, altitude, velocity, and weight of the helicopter 10 during flight thereof, the required torque of the helicopter 10. The required torque estimation unit 24 outputs the estimated required torque to the state determination unit 22.

Next, by reference to FIG. 3, processing related to the torque estimation program 29 executed by the above described torque estimation apparatus 12 will be described.

Firstly, the torque estimation apparatus 12 obtains, at the parameter standardization unit 16, a present engine performance parameter and an engine torque corresponding to the engine performance parameter, from the various sensors via the storage device 14 (Step S100: information obtainment process). Next, the torque estimation apparatus 12 executes, at the parameter standardization unit 16, standardization processing of standardizing the obtained engine performance parameter and engine torque (Step S102: standardization process). In the standardization process S102, by correction for removal of load applied to the present engine performance parameter and engine torque based on a use state of the loading device 41 identified by the loading device use state identification unit 20, a standardized parameter and a standardized torque, which have been standardized, are generated.

Subsequently, the torque estimation apparatus 12 calculates, at the engine performance factor calculation unit 17, an engine performance factor from the present standardized parameter and standardized torque, based on the first engine torque data D1 and second engine torque data D2 (Step S104: engine performance factor calculation process). In the engine performance factor calculation process S104, the difference, "a", and the difference, "b", which are illustrated in FIG. 2, are calculated, and with the calculating formula, "b/a×100", the engine performance factor is calculated.

Next, the torque estimation apparatus 12 calculates, at the available torque estimation unit 18, the available torque N2 corresponding to the present performance of the engine 28, based on the calculated engine performance factor (Step S106: available torque calculation process). In the available torque calculation process S106, as illustrated in FIG. 2, the first engine torque Nmax and the second engine torque Nmin corresponding to a preset TGT limiting value are obtained; and a standardized torque is calculated as the present available torque N2, the standardized torque corresponding to the difference, "b", when the difference, "a", in the engine performance factor is made to correspond to the difference between the obtained first engine torque Nmax and second engine torque Nmin.

Thereafter, the torque estimation apparatus 12 calculates, at the state determination unit 22, a torque margin resulting from subtraction of a required torque estimated by the required torque estimation unit 24 from the calculated available torque N2 (Step S108).

The torque estimation apparatus 12 then executes, at the state determination unit 22, notification processing based on magnitude of the torque margin (Step S110).

Subsequently, the torque estimation apparatus 12 determines whether or not the engine 28 has been stopped (Step S112), and if it is determined that the engine 28 has been stopped (Step S112: Yes), the torque estimation program 29 is ended. In contrast, if it is determined that the engine 28 has not been stopped (Step S112: No), the torque estimation apparatus 12 proceeds to Step S100, and repeatedly executes the estimation of the available torque N2 based on the newly measured present measurement point.

Next, by reference to FIG. 4, a history of engine performance factor displayed on the display device 44 provided in the airframe 25 of the helicopter 10 will be described. In the graph illustrated in FIG. 4, the vertical axis corresponds to the engine performance factor and the horizontal axis corresponds to time. The control device 15 accumulates the engine performance factors calculated in the engine performance factor calculation processing in association with times, at which the engine performance factors were calculated, into the storage device 14. Further, the control device 15 causes the display device 44 to display thereon the engine performance factors stored in the storage device 14 as a history of the engine performance factors that have been arranged in chronological order. Accordingly, the torque estimation apparatus 12 notifies the pilot of transition of the engine performance factor.

As described above, according to this embodiment, based on the first engine torque data D1 and the second engine torque data D2, the engine performance factor is calculated from the present engine performance parameter and engine torque obtained from the engine 28, and based on the engine performance factor, the available torque N2 corresponding to the present performance of the engine 28 is able to be calculated. Therefore, since there is no need for more than one measurement point to be obtained as done conventionally, even if more than one measurement point is unable to be obtained, based on the engine performance factor, the available torque N2 is able to be estimated accurately and quickly.

Further, according to this embodiment, in the engine performance factor calculation processing, by use of the first parameter T2, the second parameter T3, and the standardized parameter T1, the engine performance factor is able to be calculated easily.

Further, according to this embodiment, in the available torque calculation processing, by association of each of the differences, "a" and "b", in the engine performance factor with the engine torque, the available torque N2 is able to be calculated easily.

Further, according to this embodiment, since, in calculation of the available torque N2, the engine performance parameter and engine torque are able to be obtained in the appropriate torque region, the available torque N2 that is accurate is able to be calculated.

Further, according to this embodiment, since, in the standardization processing, the appropriate parameter and engine torque that have been standardized are able to be obtained by the removal of unnecessary factors, such as the outside air temperature outside the helicopter 10, the altitude where the helicopter 10 is flying, the velocity of the helicopter 10, and the like, in addition to the influence of the load on the engine performance parameter and engine torque due to the use of the loading device 41 of the helicopter 10; the available torque N2 is able to be calculated accurately.

Further, according to this embodiment, the available torques N2 for plural types of engine output ratings are able to be calculated.

Further, according to this embodiment, since a history of the engine performance factor is able to be displayed on the display device 44, change in the engine performance factor over time is able to be grasped.

Further, based on the available torque N2 that has been estimated accurately and quickly, the pilot is able to manipulate the helicopter 10, and thus the embodiment is able to contribute to improvement of safety upon flight of the helicopter 10.

The first engine torque data D1 and the second engine torque data D2 in this embodiment are arbitrarily settable. Further, the first engine torque data D1 and the second engine torque data D2 are updatable, and by being updated, the first engine torque data D1 and the second engine torque data D2 that are accurate are able to be used, and estimation accuracy for the available torque N2 is able to be improved.

Further, in the available torque calculation processing, the available torque N2 is calculated by association of each of the differences, "a" and "b", in the engine performance factor with the engine torque, but the embodiment is not limited to this configuration. As long as a configuration that calculates the available torque N2 by use of the engine performance factor is adopted, any calculation method may be used. For example, in the available torque calculation processing, a standardized torque, for which a difference between the first parameter T2 and the TGT limit value L1 or L2 corresponds to the difference, "b", in the engine performance factor when a difference between the first parameter T2 and the second parameter T3 is made to correspond to the difference, "a", in the engine performance factor, may be calculated as the available torque N2. That is, in this available torque calculation processing, by application of each of the differences, "a" and "b", of the standardized TGT in the engine performance factor, as it is, to the standardized TGT, the available torque N2 is calculated. In other words, in the available torque calculation processing, by application of the horizontal axis fraction in the engine performance factor, as it is, to the vertical axis fraction, the available torque N2 is calculated.

REFERENCE SIGNS LIST

10 HELICOPTER (AIRCRAFT)
12 TORQUE ESTIMATION APPARATUS
14 STORAGE DEVICE (STORAGE UNIT)
15 CONTROL DEVICE (ARITHMETIC UNIT)
16 PARAMETER STANDARDIZATION UNIT
17 ENGINE PERFORMANCE FACTOR CALCULATION UNIT
18 AVAILABLE TORQUE ESTIMATION UNIT
20 LOADING DEVICE USE STATE IDENTIFICATION UNIT
22 STATE DETERMINATION UNIT
24 REQUIRED TORQUE ESTIMATION UNIT
25 AIRFRAME
26 ROTOR
28 ENGINE
29 TORQUE ESTIMATION PROGRAM
30 TORQUE SENSOR
32 TURBINE GAS TEMPERATURE SENSOR
34 ROTATIONAL SPEED SENSOR
36 FUEL FLOW SENSOR
38 BATTERY
40 MEDIA
41 LOADING DEVICE
42 SPEAKER
44 DISPLAY DEVICE (DISPLAY UNIT)
D1 FIRST ENGINE TORQUE DATA
D2 SECOND ENGINE TORQUE DATA
P1 MEASUREMENT POINT
T1 STANDARDIZED PARAMETER
T2 FIRST PARAMETER
T3 SECOND PARAMETER
N1 STANDARDIZED TORQUE
N2 AVAILABLE TORQUE
Nmax FIRST ENGINE TORQUE
Nmin SECOND ENGINE TORQUE
L1 NORMAL TGT LIMIT VALUE
L2 EMERGENCY TGT LIMIT VALUE

The invention claimed is:

1. An aircraft-state pilot notification apparatus for an aircraft, that estimates an available torque that is an engine torque usable in a subject engine, the engine rotating a rotor that is provided in the aircraft, the aircraft-state pilot notification apparatus comprising:
a storage unit that stores therein engine torque data having a parameter related to engine performance and engine torque in association with each other, the engine torque data including first engine torque data that are engine torque data indicative of torque of an engine before degradation of engine performance, and second engine torque data that are engine torque data indicative of torque of an engine after the degradation of engine performance;
an arithmetic unit that estimates, based on the first engine torque data and the second engine torque data, the available torque of the subject engine, wherein
the arithmetic unit executes:
information obtainment processing of measuring a present parameter of the subject engine, and obtaining the engine torque of the subject engine corresponding to the present parameter;
standardization processing of executing standardization by removing a factor unnecessary for estimation of the available torque, from the obtained present parameter and engine torque;
engine performance factor calculation processing of calculating, based on the first engine torque data and the second engine torque data, an engine performance factor that is a degree of performance degradation of the subject engine, from the parameter and engine torque that have been standardized; and available torque calculation processing of calculating, based on the calculated engine performance factor, the available torque corresponding to present performance of the subject engine; and
an indication device that indicates information indicative of the available torque corresponding to present performance of the subject engine for the pilot.

2. The aircraft-state pilot notification apparatus for the aircraft, according to claim 1, wherein
where the parameter and the engine torque that have been standardized in the standardization processing are respectively a standardized parameter and a standardized torque,
in the engine performance factor calculation processing, the parameter of the first engine torque data corresponding to the standardized torque is obtained as a first parameter, the parameter of the second engine torque data corresponding to the standardized torque is obtained as a second parameter, and a ratio of a difference between the first parameter and the standardized parameter with respect to a difference between the obtained first parameter and second parameter is calculated as the engine performance factor.

3. The aircraft-state pilot notification apparatus for the aircraft, according to claim 2, wherein in the available torque calculation processing, the engine torque of the first engine torque data corresponding to a preset limit value of the parameter is obtained as a first engine torque, the engine torque of the second engine torque data corresponding to the preset limit value is obtained as a second engine torque, and the engine torque corresponding to a difference between the first parameter and the standardized parameter when a difference between the first parameter and the second parameter in the engine performance factor is made to correspond to a difference between the obtained first engine torque and second engine torque is calculated as the available torque.

4. The aircraft-state pilot notification apparatus for the aircraft, according to claim 1, wherein in the information obtainment processing, the parameter and the engine torque are obtained in a torque region that is equal to or greater than 20% of a rated torque, the rated torque being the engine torque that has been rated.

5. The aircraft-state pilot notification apparatus for the aircraft according to claim 1, wherein in the standardization processing, standardization is executed by correction of the parameter and the engine torque such that load applied to the parameter and the engine torque due to use of a loading device provided in the aircraft is removed as the unnecessary factor.

6. The aircraft-state pilot notification apparatus for the aircraft, according to claim 1, wherein
the engine has plural types of engine output ratings set therefor; and
the available torque is estimated according to each one of the types of engine output ratings.

7. The aircraft-state pilot notification apparatus for the aircraft, according to claim 1, further comprising:
a display unit, wherein
the arithmetic unit accumulates the engine performance factors calculated in the engine performance factor calculation processing in association with times of the calculation into the storage unit, and causes the display unit to display thereon the engine performance factors that have been stored in the storage unit, as a history of the engine performance factors arranged in chronological order.

8. An aircraft, comprising:
an aircraft body;
a rotor provided in the aircraft body;
an engine that is provided in the aircraft body and rotates the rotor; and
the aircraft-state pilot notification apparatus according to claim 1.

9. A non-transitory computer readable recording medium storing thereon an aircraft-state pilot notification program executed in a torque estimation apparatus that is hardware provided in an aircraft, wherein
the torque estimation apparatus comprises:
a storage unit that stores therein engine torque data having a parameter related to engine performance of a subject engine that rotates a rotor provided in the aircraft and engine torque in association with each other, the engine torque data including first engine torque data that are engine torque data indicative of torque of an engine before degradation of engine performance, and second engine torque data that are engine torque data indicative of torque of an engine after the degradation of engine performance; and
an arithmetic unit that estimates, based on the first engine torque data and the second engine torque data, an available torque of the subject engine, that is an engine torque usable in the subject engine, and
the torque estimation program causes the arithmetic unit to execute:
information obtainment processing of measuring a present parameter of the subject engine, and obtaining the engine torque of the subject engine corresponding to the present parameter;
standardization processing of executing standardization by removing a factor unnecessary for estimation of the available torque, from the obtained present parameter and engine torque;
engine performance factor calculation processing of calculating, based on the first engine torque data and the second engine torque data, an engine performance factor that is a degree of performance degradation of the subject engine, from the parameter and the engine torque that have been standardized;
available torque calculation processing of calculating, based on the calculated engine performance factor, the available torque corresponding to present performance of the subject engine; and
indication of information indicative of the available torque corresponding to present performance of the subject engine for the pilot.

10. An aircraft-state pilot notification method for an aircraft, for estimating an available torque that is an engine torque usable in a subject engine, the engine rotating a rotor provided in the aircraft, wherein
engine torque data having a parameter related to engine performance and engine torque in association with each other are prepared beforehand, the engine torque data including first engine torque data that are engine torque data indicative of torque of an engine before degradation of engine performance, and second engine torque data that are engine torque data indicative of torque of an engine after the degradation of engine performance; and the torque estimation method comprises:
an information obtainment process of measuring a present parameter of the subject engine, and obtaining the engine torque of the subject engine corresponding to the present parameter;

a standardization process of executing standardization by removing a factor unnecessary for estimation of the available torque, from the obtained present parameter and engine torque;

an engine performance factor calculation process of calculating, based on the first engine torque data and the second engine torque data, an engine performance factor that is a degree of performance degradation of the subject engine, from the parameter and the engine torque that have been standardized;

an available torque calculation process of calculating, based on the calculated engine performance factor, the available torque corresponding to present performance of the subject engine; and an indication process that indicates information indicative of the available torque corresponding to present performance of the subject engine for the pilot.

* * * * *